United States Patent [19]

Parmeter

[11] Patent Number: 5,404,061
[45] Date of Patent: Apr. 4, 1995

[54] OIL-FILLED MOTOR PROTECTOR

[75] Inventor: Larry J. Parmeter, Bartlesville, Okla.

[73] Assignee: Camco International Inc., Houston, Tex.

[21] Appl. No.: 117,496

[22] Filed: Sep. 7, 1993

[51] Int. Cl.⁶ .................... F04D 13/08; F04B 19/00
[52] U.S. Cl. ............................ 310/87; 310/52; 251/349; 417/414
[58] Field of Search .................... 310/52, 59, 64, 87, 310/88; 417/321, 366, 367, 368, 410 R, 414, 422; 251/344, 349, 350, 357, 900

[56] References Cited

U.S. PATENT DOCUMENTS

| | | | |
|---|---|---|---|
| 1,855,274 | 4/1932 | Arutunoff | 310/87 |
| 2,020,513 | 11/1935 | Mendenhall et al. | 310/87 |
| 2,266,039 | 12/1941 | Hollander et al. | 310/87 |
| 4,010,392 | 3/1977 | Bogdanov et al. | 310/87 |
| 4,262,226 | 4/1981 | Erickson | 310/87 |
| 4,421,999 | 12/1983 | Beavers et al. | 310/87 |
| 4,913,239 | 5/1990 | Bayh, III | 166/385 |
| 4,940,911 | 7/1990 | Wilson | 310/87 |
| 4,981,420 | 1/1991 | Jenson et al. | 417/423.3 |
| 5,213,159 | 5/1993 | Schneider | 166/250 |

Primary Examiner—Steven L. Stephan
Assistant Examiner—D. R. Haszko

[57] ABSTRACT

A motor oil-filled protector device for use with an electric submergible pump motor, includes a tubular extension to inhibit contaminated fluid from contacting an internal pressure relief valve. A motor oil pressure relief valve within the protector has an intake in fluidic communication with at least one motor oil-filled expandable chamber and has a discharge in fluidic communication with a fluid-filled section of the housing. Over a period of time, wellbore fluids tend to leak into and displace motor oil within the fluid-filled section. A tubular extension is connected to the discharge of the pressure relief valve and extends into a lower portion of the fluid filled section. When motor oil is discharged from the pressure relief valve, such motor oil will tend to stay within the tubular extension, because the oil is lighter than the wellbore fluids, and thereby inhibit the wellbore fluids from contacting and possibly harming the operation of the pressure relief valve.

6 Claims, 3 Drawing Sheets

OIL-FILLED MOTOR PROTECTOR

BACKGROUND OF THE INVENTION

1. Field of the Invention

The present invention relates to oil-filled protectors for use with electric motors and, more particularly, oil-filled protectors for use with electric motors used with electric submergible pumps that are suspended within wellbores.

2. Setting of the Invention

Electric submergible pumps (ESP's) are widely used throughout the world for recovering subterranean fluids to the earth's surface. For the long term successful operation of such ESP's, the electric motor must be supplied with uncontaminated, cooling motor oil. Unfortunately, it has been found that the motor oil can become contaminated over time by wellbore fluids. This contamination can lead to shortened operational life, which in turn will cause the premature shutting-in of the wellbore, and the costly removal and repair of the ESP.

Specifically, the electric motors used in ESP's will almost always include an oil-filled motor protector to permit the expansion and contraction of the motor oil, and which are sealed to prevent wellbore fluids from contaminating the motor oil used to cool the electric motor. One important feature found in most such protectors is a one-way acting pressure relief valve, which allows motor oil to be vented out from the internal expandable chambers if the motor oil expansion cannot be accommodated when the temperature of the motor oil increases during operation. Usually, the motor oil is vented to a cavity or internal section of the protector that is filled with clean motor oil. However, despite numerous arrangements to prevent wellbore fluid contamination of the motor oil, over time, wellbore fluids leak into, and displace the oil and eventually fill this section. One prior arrangement to prevent wellbore fluids from contaminating the motor oil is shown in U.S. Pat. No. 4,421,999, which discloses a U-shaped tube connected to the intake of the pressure relief valve.

If wellbore fluids come into contact with the pressure relief valve, the valve itself may be damaged because wellbore fluids contain chemicals and suspended solids. When these wellbore fluids come into contact with the pressure relief valve, elastomeric O-ring seal(s) used therein can be chemically destroyed thereby causing a gap to be formed in the seal so that wellbore fluid can by-pass the valve and enter the interior of the protector. Also, upon the opening of the pressure relief valve, the suspended solids can become trapped between the valve seat and the valve's poppet or the ball so that the pressure relief valve will not fully close, resulting in wellbore fluids being able to leak past the pressure relief valve.

There is a need for a simple, efficient, and inexpensive mechanism to inhibit or preferably prevent wellbore fluids that enter the normally oil-filled section in the motor protector from coming into contact with the pressure relief valve, and thereby ensure the desired long term operational life of the ESP.

SUMMARY OF THE INVENTION

The present invention has been contemplated to overcome the foregoing deficiencies and meet the above described needs. The present invention comprises a motor oil-filled protector for use with an electric submergible pump motor, with the protector including a mechanism to prevent wellbore fluids from contacting a pressure relief valve within the protector. The protector includes an outer housing that is adapted to be interconnected with an electric motor and a pump, and includes one or more oil-filled expandable chambers in fluidic communication with the electric motor.

A pressure relief valve within the housing has an intake opening in fluidic communication with one or more the oil-filled expandable chambers and has a discharge opening in fluidic communication with a normally oil-filled cavity or section within the housing. A tubular extension is connected across the discharge opening of the pressure relief valve and extends into the normally oil-filled section.

Since wellbore fluids have a higher density than the cooling oil, the wellbore fluids that enter the normally oil-filled cavity or section will tend to accumulate adjacent a lower portion thereof. When motor oil needs to be vented through the pressure relief valve, the motor oil will flow downwardly through the tubular extension. Since the motor oil will float on top of the wellbore fluid, a certain quantity of motor oil will stay within the extension tube and thereby will be the only fluid in contact with the valve seat. In this manner, contaminating wellbore fluids are prevented or at the least inhibited from coming into contact with the valve seat, so that the leakage of wellbore fluids past the pressure relief valve can be prevented.

DETAILED DESCRIPTION OF THE PREFERRED EMBODIMENTS

Figure 1:
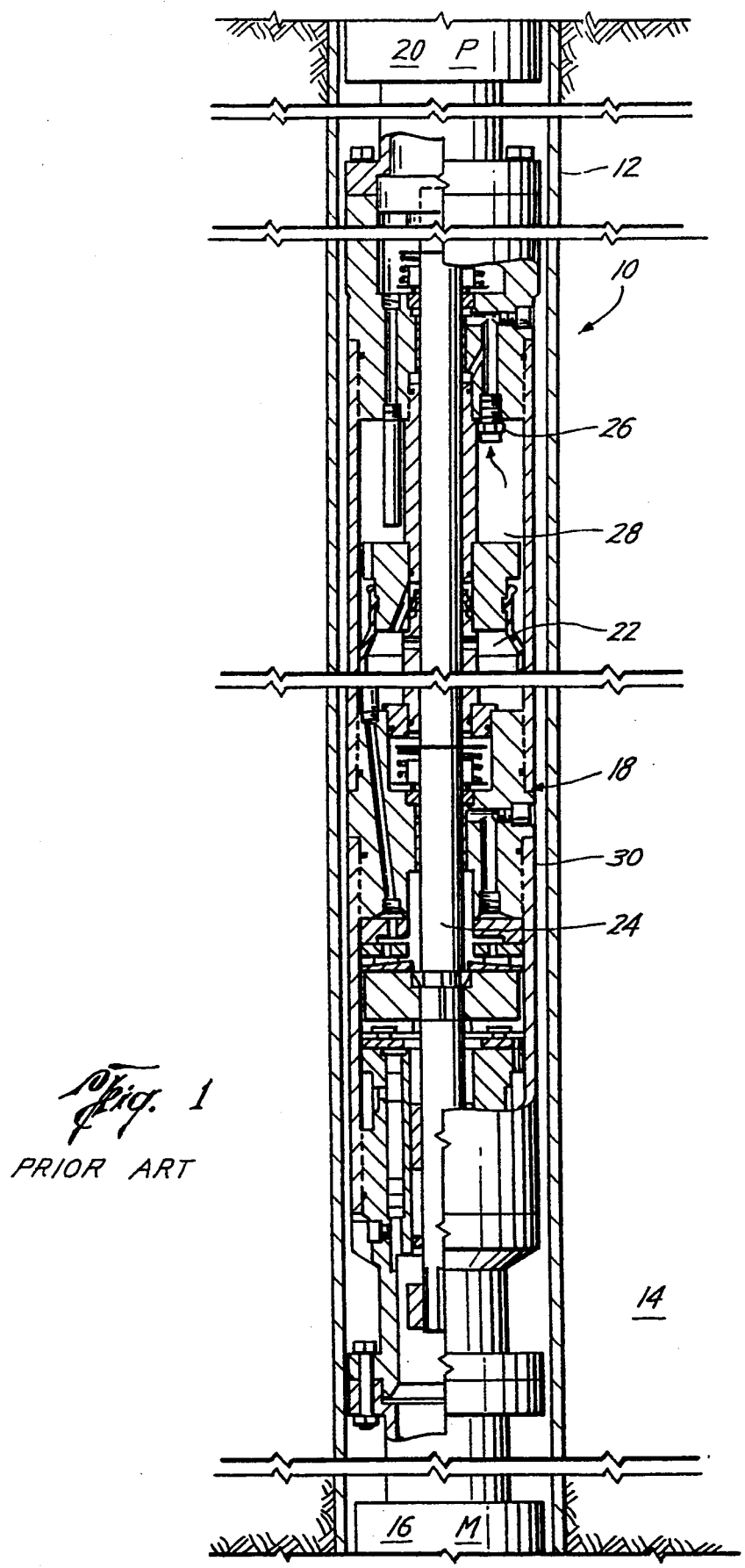
FIG. 1 is a vertical sectional view of a motor oil-filled protector device, of the prior art, shown operationally interconnected between a pump and an electric motor, and shown suspended within a subterranean wellbore.

As described above, the present invention is a motor oil-filled protector device for use with an electric submergible pump motor, and which includes a tubular extension on a pressure relief valve to inhibit wellbore fluid from contacting and thereby potentially fouling the pressure relief valve. To aid in the understanding of the present invention, reference is made to FIG. 1, which shows a prior ESP 10 suspended within a casing or tubing 12, which in turn is set within a wellbore that penetrates one or more subterranean earthen formations 14. The ESP 10 comprises an electric motor 16, an oil-filled motor protector 18, and a pump 20. Many different arrangements and types of ESP motors 16, protectors 18 and pumps 20 are commercially available, as are all well known to those skilled in the art. As is well known to those skilled in the art, the purpose of the motor protector 18 is to permit the expansion and contraction of cooling motor oil and to prevent any wellbore fluids from coming into contact with the internal workings of the motor 16. The protector 18 includes a plurality of oil-filled expansion chambers 22, which are usually formed from elastomeric bags, and with a drive shaft 24 extending therethrough connecting the shaft of the motor 16 to the shaft of the pump 20.

As the temperature of the motor oil increases while the motor 16 is in operation, the cooling motor oil expands and thereby expands the chambers 22. In the event that the volume within the chambers 22 cannot be increased any more and the oil volume is still expanding, then the pressure of the oil will cause a pressure relief valve 26 to open and release some of the oil into a fluid filled cavity or section 28 within the interior of a housing 30 of the protector 18. This fluid filled section 28 is completely filled with motor oil prior to installation of the ESP 10 into the wellbore, therefore, any fluids that contact the pressure relief valve 26 should be uncontaminated motor oil.

Unfortunately, due to the temperatures, pressures, and the chemicals encountered within a wellbore, over a period of time the outer seals within the protector 18 may leak, thereby allowing wellbore fluids to enter into the interior of the protector 18. In some circumstances, wellbore fluids have been found in the fluid filled section 28. Since wellbore fluids have a density greater than the motor oil, the wellbore fluids will tend to accumulate adjacent a lower portion of the section 28. As long as the wellbore fluids do not come into contact with pressure relief valve 26 (located adjacent an upper portion of the section 28), then the operation of the valve 26 should be unaffected by this invasion of the wellbore fluids. However, over time the wellbore fluids will continue to displace the motor oil in the section 28 to such an extent that the valve 26 will be in fluid contact with the wellbore fluids. Also, if the ESP 10 is suspended in a wellbore that is at an angle, such as in a deviated wellbore, the angle from vertical will cause wellbore fluids to contact the valve 26 sooner than if the ESP 10 was vertically set.

The wellbore fluids cause harm to the operation of the valve 26 in the following ways. For background purposes, the valve 26 is usually a simple caged ball valve whereby a ball is releasably held in sealing contact by a spring with an annular valve seat. Also, the valve 26 can be a simple poppet valve comprising a poppet disk held in sealing contact by a spring with an elastomeric O-ring seal. Certain chemicals under wellbore temperatures and pressures can etch the annular valve seat and/or the ball, thereby permitting the wellbore fluids to leak past the valve 26 and pass into the interior of the protector 18. Once wellbore fluids enter the protector 18, the motor oil becomes contaminated can lead directly to premature motor failure. Also, the chemicals in the wellbore fluids can cause the elastomeric O-ring to become brittle, and break and leak. Further, the wellbore fluids contain relatively large concentrations of suspended particles of earthen materials. When the valve 26 opens in response to the internal pressures, these solids come into contact with and become trapped on the valve seat, thereby preventing the complete sealing of the valve 26. Thus, wellbore fluids will leak past the valve 26, and cause motor harm as described above.

Figure 2:
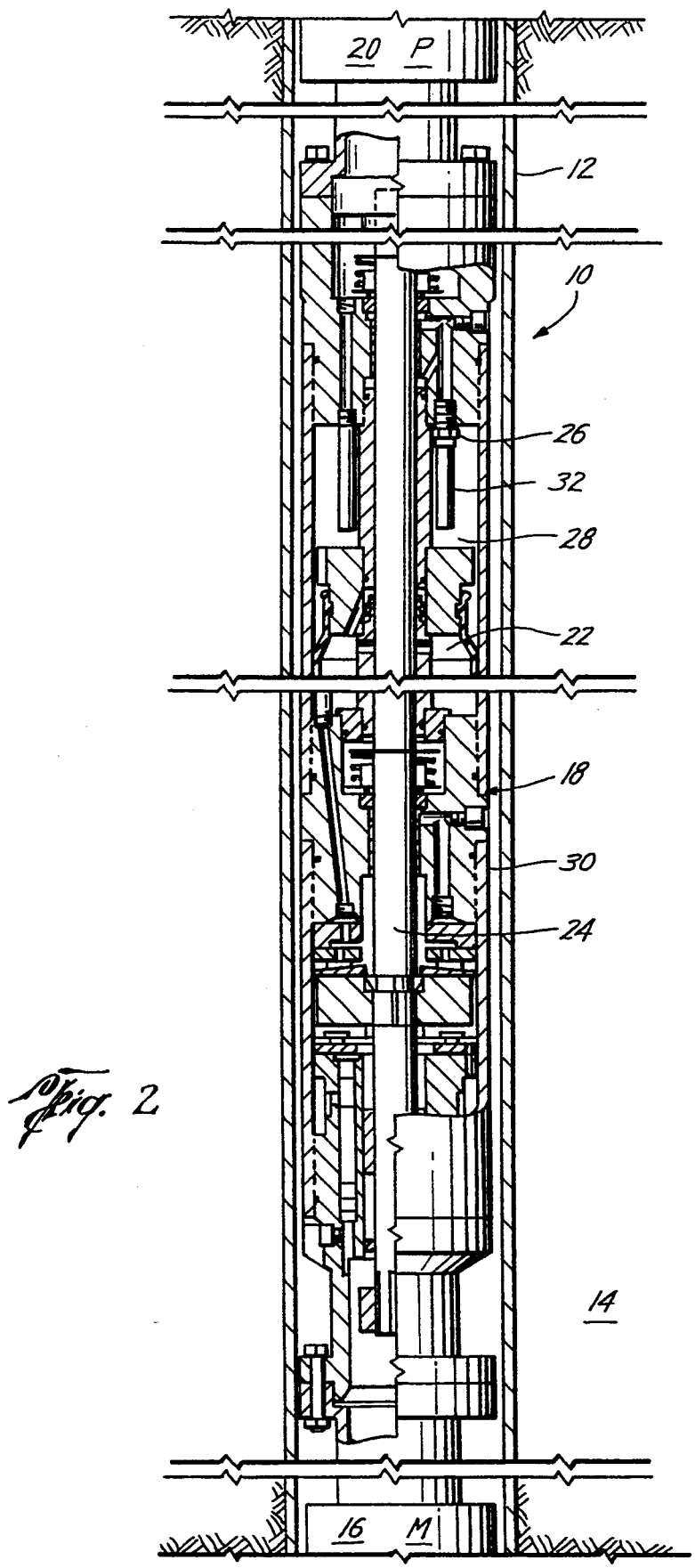
FIG. 2 is a vertical sectional view of a motor oil-filled protector device, of one preferred embodiment of the present invention, shown operationally interconnected between a pump and an electric motor, and shown suspended within a subterranean wellbore.
Figure 3:
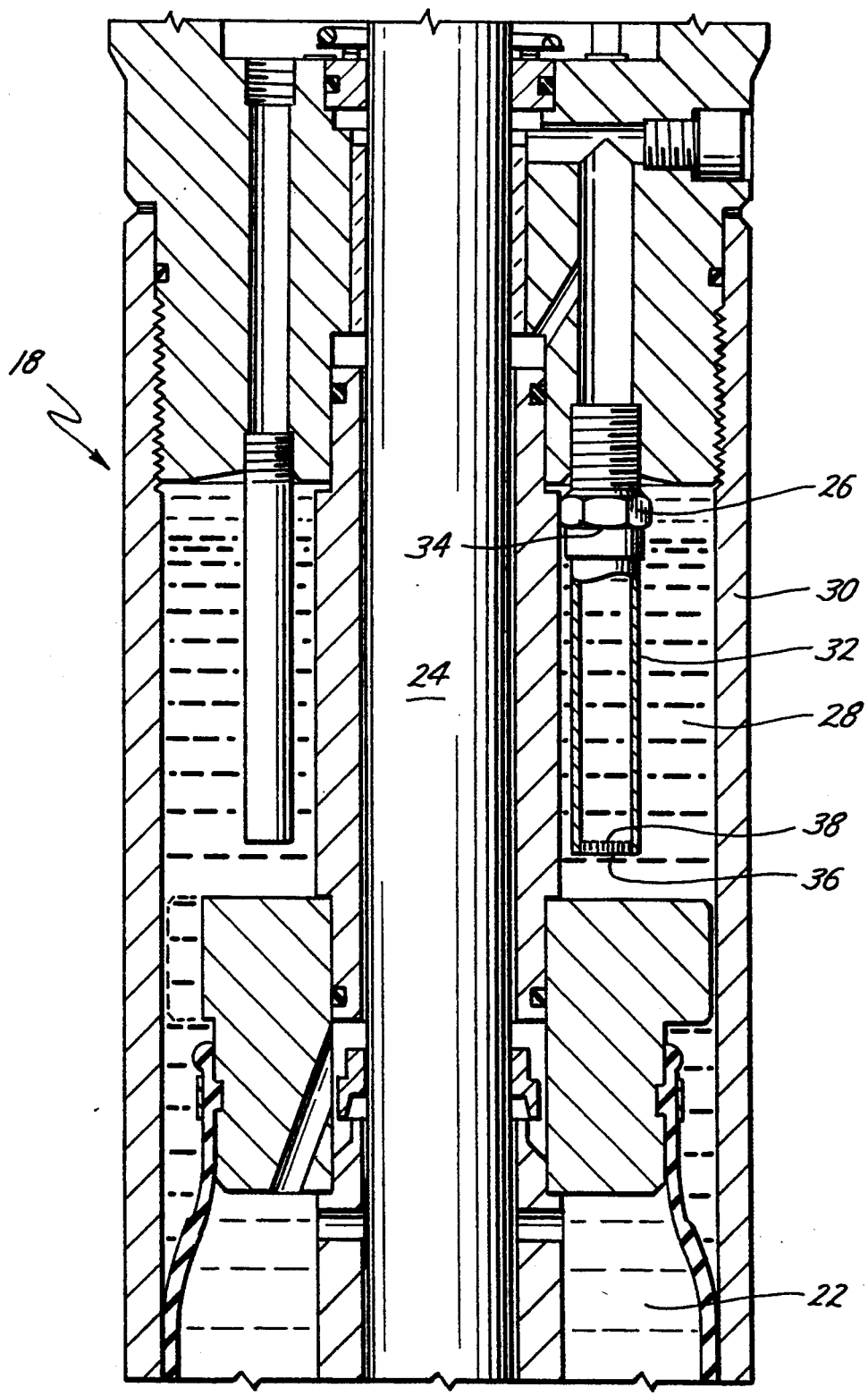
FIG. 3 is a vertical sectional view of pressure relief valve, of one preferred embodiment of the present invention, within a protector, and showing fluid levels of motor oil and wellbore fluids within a fluid-filled chamber within the protector.

In order to prevent or at least inhibit the wellbore fluids from coming into contact with the valve 26, the present invention has been developed. As shown in FIGS. 2 and 3, on preferred embodiment of the present invention comprises, in combination with the protector 18, a tubular extension 32 connected across a discharge opening 34 of the valve 26. The tubular extension 32 extends into the fluid-filled section 28, and an open end 36 of the tubular extension 32 is located adjacent a lower portion of the section 28. The configuration and sizing of the extension 32 is chosen to prevent or at the least inhibit wellbore fluids from coming into contact with the valve 26. For the purposes of the present discussion, the tubular extension 32 will be referred to as being a right cylinder and formed from steel. As will be apparent from the following discussion, any other configuration can be used that will prevent or at the least inhibit the wellbore fluids from contacting the valve 26. Such alternate configurations include curved, spiral, and bent tubes, and U-tubes. One or more screens or filters 38 can be included within the tubular extension 32 to assist in preventing wellbore fluids from contacting the valve 26.

As wellbore fluids enter the section 28, as shown by the fluid levels in FIG. 3, motor oil rises to the upper portion of the section 28 and to the upper portion of the interior of the tubular extension 32. If the level of the wellbore fluids reaches or passes the level of the discharge opening 34 of the valve 26, some oil will remain trapped within the tubular extension 32 and will ride on the wellbore fluids, thereby ensuring that the valve 26 remains in contact only with uncontaminated motor oil.

The inventor has found through testing that while the tubular extension 32 appears to be quite simple, the choice of the size and configuration thereof can dramatically affect the ability of the tubular extension to function properly. Specifically, the inventor has found that the tubular extension is preferably long enough to trap sufficient quantity of oil therewithin but not so long as to increase its cost unnecessarily and not to create a back pressure on the valve 26 to prevent it from being able to function properly. A length of from about 1.0 to about 8.0 times the internal diameter has been found to be satisfactory with a preferred length of about 5.0 to about 6.0 times the internal diameter. Also, the internal diameter is preferably small enough to prevent unnecessary wellbore fluid from entering the tubular extension but not so small as to create a back pressure that would inhibit the proper operation of the valve 26 or to draw wellbore fluids upwardly by capillary action. An internal diameter of from about 1/16" to about 2.0" has been found to be satisfactory, with from about 1/16" to about ¼" being preferable. Obviously, the length, diameter, and shape of the tubular extension 32 depends upon the internal configuration and size of the protector 18. In one preferred embodiment, with a housing 30 having an outer diameter of 5.4: and, the valve 26 having an opening 34 of 0.02" the tubular extension 32 is 2.38" long and has an internal diameter of ¼".

Whereas the present invention has been described in particular relation to the drawings attached hereto, it should be understood that other and further modifications, apart from those shown or suggested herein, may be made within the scope and spirit of the present invention.

What is claimed is:

1. A motor oil filled protector device for use with an electric submergible pump motor, comprising:
    a housing adapted for interconnection with an electric motor of a type suspended within a wellbore, the housing including a motor oil filled expandable chamber capable of being in fluidic communication with the electric motor;

a motor oil pressure relief valve having an intake in fluidic communication with the motor oil filled expandable chamber and having a discharge adjacent an upper portion of a fluid filled section of the housing; and a tubular extension means for inhibiting contaminated fluid within the fluid filled section from contacting the discharge of the pressure relief valve, the tubular extension means comprising a straight elongated tube connected at an upper end thereof to the discharge of the pressure relief valve and extending downwardly with a lower open end submerged within a lower portion of the fluid filled section.

2. The device of claim 1 wherein the pressure relief valve comprises an annular valve seat, a ball, and spring means for biasing the ball into sealing engagement with the valve seat.

3. The device of claim 1 wherein the pressure relief valve comprises an elastomeric O-ring, and a spring biased poppet in sealing engagement with the O-ring.

4. The device of claim 1 wherein the contaminated fluid comprises wellbore fluid.

5. The device of claim 1 wherein the tubular extension has a length of from about 1.0 to about 8.0 times its internal diameter.

6. The device of claim 4 wherein the tubular extension has an internal diameter of from about 1/16" to about ¾".

* * * * *